3,252,973
ACYLATION VIA CARBODIIMIDES FOR PENICILLIN AND CEPHALOSPORIN PREPARATION

Edwin H. Flynn, Indianapolis, Ind., assignor to Eli Lilly and Company, Indianapolis, Ind., a corporation of Indiana
No Drawing. Filed Oct. 8, 1962, Ser. No. 229,231
10 Claims. (Cl. 260—239.1)

This application is a continuation-in-part of my application Serial No. 852,983, filed November 16, 1959, now abandoned.

This invention relates to antibiotic substances. More particularly, it relates to a novel process of preparing penicillin and cephalosporin compounds.

"Penicillin" is a generic term applied to a group of antimicrobially active chemical compounds which can be represented by the following formula:

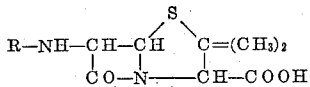

in which R represents a carbacyl group.

"Cephalosporin" is now employed as a generic term applied to a group of antimicrobially active chemical compounds which can be represented by the following formula:

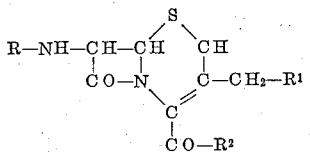

in which R represents a carbacyl group, $R^1$, taken alone, is —OH, $C_1$–$C_8$ acyloxy, or tertiary-amino, $R^2$ is —OH, when $R^1$ is —OH, $R^2$ is —OH when $R^1$ is $C_1$–$C_8$ acyloxy, $R^2$ is —O$^-$ when $R^1$ is tertary-amino, and $R^1$ and $R^2$, when taken together, are —O$^-$.

The first commercially important penicillin, penicillin G, having a phenylacetyl group as the R group in the above formula, is produced in conjunction with certain other penicillins by the culturing of a penicillin-producing mold of the group *Penicillium chrysogenum-notatum*. Many other penicillins such as the penicillin wherein R is phenoxyacetyl (commonly referred to as phenoxymethyl penicillin or penicillin V) can be produced by growing a penicillin-producing organism in a fermentation medium to which a precursor compound has been added to provide a source for the R group. A great number of penicillins have been provided by such addition of precursor compounds as illustrated by U.S. Patents Nos. 2,440,355–61, 2,449,193, 2,449,195, and 2,479,295–7.

Only one species of the cephalosporins has so far been obtained by fermentation means, this being the so-called "cephalosporin C," in which R is 5'-aminoadipyl. Its preparation is carried out by fermenting a suitable nutrient medium with a microorganism of the genus Cephalosporium, as described in British Patent Specification 810,196, published March 11, 1959.

Fermentation has been unsuccessful in producing other cephalosporins and many of the penicillins. It has been necessary, therefore, to devise alternative methods. These methods have generally proceeded through the preparation of the penicillin or cephalosporin nucleus (in which R of the above formulas represents a hydrogen atom), followed by acylation of the nucleus with the appropriate carbacyl halide or anhydride. The preparation of the penicillin nucleus (6-aminopenicillanic acid) is described in Doyle et al., U.S. Pat. 2,941,995 (June 21, 1960). (See also Kato, Journal of Antibiotics (Ser. A.) 6, 130 (1953); and Journal of Antibiotics (Ser. A.) 6, 184 (1953); and Sakagouchi et al., J. Agr. Chem. Soc. (Japan), 23, 411 (1950).) The preparation of the cephalosporin nucleus (7-aminocephalosporanic acid and its variant forms as disclosed above) is described by Abraham and Newton in Belgian Pat. 593,777 (délivré August 31, 1960).

The present invention is an improvement in the acylation technique which permits acylation of the penicillin or cephalosporin nucleus under mild conditions employing as the acylating agent a monocarboxylic acid corresponding to the desired carbacyl moiety.

It is an object of this invention to provide a novel method of providing penicillin and cephalosporin compounds.

It is a further object of the invention to provide penicillins and cephalosporins which fermentation procedures have failed to provide.

Other objects of the invention will be obvious from the description which follows.

In accordance with the invention, the desired reaction of penicillin nucleus or cephalosporin nucleus with a monocarboxylic acid affording the desired carbacyl radical is carried out by commingling a carbodiimide compound with the nucleus in an aqueous inert mutual solvent in the presence of at least one equivalent proportion of the monocarboxylic acid or a salt thereof.

In a preferred embodiment of the invention, penicillin nucleus is suspended in distilled water at about room temperature and is dissolved by adding aqueous 1 N sodium hydroxide solution to about neutrality. To the resulting solution is added an equivalent quantity of the appropriate monocarboxylic acid to yield the desired penicillin, the acid being added in the form of the sodium salt dissolved in water. To the resulting mixture is added N,N'-diisopropylcarbodiimide in about 10 percent molar excess to the monocarboxylic acid, the carbodiimide being preferably added as a solution in an inert solvent, e.g., a water-miscible organic solvent such as dioxane or acetone. The pH of the reaction mixture is desirably adjusted to the range of about 5 to about 8. The reaction mixture is permitted to stand as required to bring about the formation of the desired penicillin compound. It has been found suitable to permit the reaction to continue for about 16 hours. Customarily, it is not advantageous to continue the reaction for longer than about two or three days. It is presently preferred to maintain the reaction mixture at refrigeration temperatures, for example, from about 2° C. to about 10° C. However, the reaction can be conducted at a temperature outside the above range, e.g., at room temperature or somewhat above. The penicillin can be isolated from the reaction mixture employing procedures well known to the art.

The term "inert," when used herein in description of solvents used in the process, means solvents that will not interact with the reactants to prevent or to interfere substantially with the formation of the desired penicillin or cephalosporin.

In respect to the quantity of monocarboxylic acid and carbodiimide compounds employed, it has been found suitable to employ amounts at least equimolar to the penicillin or cephalosporin nucleus used. For more efficient conversion of nucleus to the desired product, it is preferred to use at least a slight excess of the monocarboxylic acid and carbodiimide compounds. In fact, one to two molar excesses of the monocarboxylic acid and carbodiimide reactants can be employed to insure efficient conversion.

The acid employed to supply the R group as defined above is a monocarboxylic acid. It will be apparent that a great number and variety of monocarboxylic acids can be used in the process of the invention—for example, acids which will provide penicillins that have previously been prepared by fermentation processes, as detailed in the patents relating thereto referred to above, including benzyl penicillin, n-heptyl penicillin, penicillin V, and a great number of others, as well as the cephalosporins having the same carbacyl groups (which, however, have not been available by fermentation). Many acids can be used to provide penicillins (and cephalosporins) which have not been obtainable by fermentation means. Such acids are represented by thiazolidine-5-carboxylic acid, hippuric acid, N-acetylcysteine, N-acetylglycine, and benzoic acid. The present process makes it possible to use acids which are unstable at elevated temperatures or which are unstable in the form of their halides. Other acids useful in the invention include the following:

Benzoxyacetic acid
Benzoxyphenoxyacetic acid
2-furylacetic acid
o-Nitrophenoxyacetic acid
Trimethylacetic acid
n-Butyric acid
Cinnamic acid
Benzoic acid
α-(p-tert.-butyl)phenoxypropionic acid
Phenylmercaptoacetic acid
o-Tolylmercaptoacetic acid
m-Tolylmercaptoacetic acid
p-Tolylmercaptoacetic acid
m-Chlorophenylmercaptoacetic acid
o-Bromophenylmercaptoacetic acid
o-Methoxyphenylmercaptoacetic acid
m-Trifluoromethylphenylmercaptoacetic acid
Benzylmercaptoacetic acid
Phenethylmercaptoacetic acid
n-Butylmercaptoacetic acid
β-Phenoxypropionic acid
α-Phenoxy-n-butyric acid
α-p-Nitrophenoxy-n-butyric acid
α-Phenoxyisobutyric acid
α-Phenoxyisovaleric acid
2-furoic acid
β-(2'-furyl)propionic acid
2-thienylacetic acid
3-thienylacetic acid
γ-(2'-thienyl)-n-butyric acid
2-benzofurylacetic acid
1-pyrazoleacetic acid
1,2,4-triazole-1-acetic acid
N-methyl-2-pyrrylacetic acid
N-pyrrylacetic acid
3-indoleacetic acid
3-benzothienylacetic acid
α-Phenylpropionic acid
β-Phenylpropionic acid
α-Phenyl-n-butyric acid
γ-o-Chlorophenyl-n-butyric acid
4-phenyl-3-butynoic acid
Cyclopentylacetic acid
Adamantylacetic acid
α-Naphthoic acid
β-Naphthoic acid
Adamantanecarboxylic acid
β-Naphthoxyacetic acid The soluble carbodiimides are broadly operative in the process of the present invention—viz., those compounds which have the essential structure

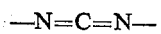

and which are soluble at least to some extent (e.g., more than about 0.1% by weight and preferably more than about 1% by weight) in the aqueous mutual solvents employed for the reaction. It will be apparent that the carbodiimides should not contain substituent groups which interfere with the production of the desired product by undergoing side reactions. The carbodiimides can be represented by the following formula $$R^1-N=C=N-R^2$$

in which $R^1$ and $R^2$ may be a $C_1-C_{12}$ aliphatic radical, a $C_3-C_7$ cycloaliphatic radical or phenyl, and in which $R^1$ and $R^2$ may be substituted with amino, alkylamino, dialkylamino, phenyl, pyridyl, pyrimidyl, piperidyl, pyrryl, pyrrolidyl, morpholinyl, and heterocyclic radicals in general having one or more nitrogen, oxygen, and/or sulfur atoms in the ring. The carbodiimides are readily prepared by a variety of methods known to the art, such as the method of Schmidt, Hitzler, and Lahde, Berichte, 71 (1938), 1933-38, who subject the corresponding thioureas to oxidation with mercuric oxide in dry ether, benzene, or carbon disulfide. The radicals $R^1$ and $R^2$ can be illustrated by methyl, ethyl, n-propyl, allyl, isopropyl, n-butyl, sec.-butyl, isobutyl, tert.-butyl, crotyl, amyl, hexyl, heptyl, octyl, isooctyl, nonyl, isononyl, decyl, undecyl, dodecyl, cyclopropyl, cyclobutyl, cyclopentyl, cyclopentenyl, cyclohexyl, cyclohexenyl, cycloheptyl, phenyl, benzyl, phenethyl, α-phenylethyl, diethylaminoethyl, α-methylpyridyl, ethylpiperidyl, and the like.

Illustrative carbodiimides include the following:

N,N'-diethylcarbodiimide,
N,N'-di-n-propylcarbodiimide,
N,N'-diisopropylcarbodiimide,
N,N'-di-n-butylcarbodiimide,
N,N'-diisobutylcarbodiimide,
N,N'-diallylcarbodiimide,
N-propyl-N'-allylcarbodiimide,
N-cyclohexyl-N'-allylcarbodiimide,
N-cyclohexyl-N'-crotylcarbodiimide,
N,N'-dicyclohexylcarbodiimide,
N-β-hydroxyethyl-N'-allylcarbodiimide,
N,N'-bis-(p-dimethylaminophenyl)carbodiimide,
N-ethyl-N'-(4''-ethylmorpholinyl)carbodiimide, and the like. Also useful are the other carbodiimides disclosed by Sheehan in U.S. Patent 2,938,892 (May 31, 1960).

The penicillin or cephalosporin nucleus employed in the invention can be used in purified form or as a concentrate, obtained for example during an intermediate stage of their preparation and recovery. Penicillin nucleus, for example, is commonly produced by fermentation in the substantially complete absence of precursor substances which would lead to the acylated derivatives. The resulting fermentation mixture is conveniently filtered, extracted with butyl acetate or the like to separate any penicillins (i.e., the acylated forms of the nucleus), and treated directly with monocarboxylic acid and carbodiimide in accordance with the present invention. A second extraction can then be employed in a known manner to recover the desired penicillin product. The filtered fermentation liquor can be subjected to a preliminary concentration before acylation if desired.

Among the desirable attributes of the process of the present invention is its wider applicability to the preparation of penicillins and cephalosporins than the processes heretofore available. For example, as noted above, many of the penicillins and all of the cephalosporins which are now available by way of the present invention cannot be prepared by fermentation processes. In a number of cases, products can now be prepared (or prepared in an improved yield) because the carbacyl moiety is stable in the form of the acid but unstable in the form of the acid halide required by the prior art. The process is advantageous in the preparation of acid-unstable penicillins, since it avoids the highly acid conditions inherent in the use of the acid halides. It also has the virtue of wide applicability, inasmuch as the acids required in the process are in general more readily available than the acid halides or acid anhydrides. Finally, the process has the economic virtue of requiring less complex and expensive equipment and fewer precautionary measures than are demanded by the prior-art processes.

The following examples will more fully illustrate the invention and demonstrate its superiority over alternative processing techniques.

EXAMPLE 1

*Phenoxymethyl penicillin (Penicillin V)*

The present invention is illustrated by the following procedure, in which a solution of penicillin nucleus and phenoxyacetic acid is prepared, and a solution of carbodiimide is commingled therewith.

Penicillin nucleus (0.5 g.) and phenoxyacetic acid (355 mg.) are dissolved in 50 ml. of water by adding aqueous 1 N sodium hydroxide to pH 6.3. To the resulting solution is added a solution of N,N'-dicyclohexylcarbodiimide (475 mg.) in 50 ml. of dioxane. The mixture is stirred for two hours, then cooled to 5° C. and allowed to stand for 24 hours. The completed reaction product mixture is filtered, stripped of dioxane under vacuum, diluted with water, layered with 200 ml. of ethyl acetate, and stirred and acidified to pH 2 with hydrochloric acid. The layers are separated, and the ethyl acetate layer is back-extracted into 100 ml. of water by addition of aqueous 1 N potassium hydroxide to pH 6.7. The aqueous extract is separated and concentrated to 75 ml. to remove residual ethyl acetate, then diluted to 100 ml. with water, and subjected to bioassy and paper chromatography. The bioassay shows about 400 penicillin G units per milliliter, and the principal antibiotic activity is identified as penicillin V by paper chromatography.

For comparison, the following illustrates an alternative technique, in which a solution of penicillin nucleus is prepared and commingled successively with a solution of a carbodiimide and a solution of phenoxyacetic acid.

Penicillin nucleus (0.5 g.) is dissolved in 25 ml. of water by adding aqueous 1 N sodium hydroxide to pH 6.4. To the resulting solution is added a solution of N,N'-dicyclohexylcarbodiimide (475 mg.) in 50 ml. of dioxane. Phenoxyacetic acid (355 mg.) is dissolved in 25 ml. of water by adding aqueous 1 N sodium hydroxide to pH 6.3, and the resulting solution is added to the mixed solutions of penicillin nucleus and N,N'-dicyclohexylcarbodiimide. The completed mixture is stirred for two hours, allowed to stand at 5° C. overnight, and worked up as described above. The product solution is found to have a bioassay of about 12 penicillin G units per milliliter, and is shown by paper chromatography to contain no more than a trace of penicillin V.

For further comparison, the following illustrates another processing technique, in which a solution of phenoxyacetic acid is prepared and commingled successively with a solution of a carbodiimide and a solution of penicillin nucleus.

Phenoxyacetic acid (0.355 g.) is suspended in 25 ml. of water, and aqueous 1 N sodium hydroxide solution is added with stirring until the pH reaches 6.3. N,N'-dicyclohexylcarbodiimide (0.475 g.) is dissolved in 50 ml. of dioxane and the carbodiimide solution is added to the solution of phenoxyacetic acid. Penicillin nucleus (0.50 g.) is suspended in 25 ml. of water and aqueous 1 N sodium hydroxide solution is added to pH 6.3 with stirring. The resulting solution is added to the mixed solutions of phenoxyacetic acid and N,N'-dicyclohexylcarbodiimide. The mixture is stirred for two hours and allowed to stand overnight at 5° C., then stripped of dioxane under vacuum, diluted with water, layered with 200 ml. of ethyl acetate (pH still 6.3), and acidified to pH 2 with hydrochloric acid. The layers are separated and the ethyl acetate layer is back-extracted into 100 ml. of water by addition of aqueous 1 N sodium hydroxide solution to pH 6.7. The aqueous extract assays around 73 penicillin G units per milliliter, and paper chromatography confirms the major activity to be penicillin V.

EXAMPLE 2

*t-Butyl penicillin*

Trimethylacetic acid (282 mg.) is dissolved in 20 ml. of distilled water and the solution is adjusted to pH 6.6 by addition of aqueous 1 N sodium hydroxide with stirring. 6-aminopenicillanic acid (200 mg.) is then added thereto. A solution of N,N'-dicyclohexylcarbodiimide (190 mg.) in 20 ml. of dioxane is added, and the mixture is stirred intermittently for about two hours, then allowed to stand at about 5° C. for 60 hours. The reaction mixture is filtered to remove a small quantity of precipitate, which is discarded. The filtrate is evaporated to dryness in vacuo. The dried residue, comprising N-trimethylacetyl-6-aminopenicillanic acid (t-butyl penicillin), has activity in the penicillin assay employing the organism *Staphylococcus aureus* (hereinafter referred to as "penicillin assay"), which activity can be destroyed with penicillinase.

EXAMPLE 3

*Styryl penicillin*

Styryl penicillin (N-cinnamoyl - 6 - aminopenicillanic acid) is obtained by the reaction of 410 mg. of cinnamic acid, 200 mg. of 6-aminopenicillanic acid, and 190 mg. of N,N'-dicyclohexylcarbodiimide according to the procedure and under the conditions of Example 2.

EXAMPLE 4

*Phenyl penicillin*

Benzoic acid (336 mg.) is dissolved in 20 ml. of water and the solution is adjusted to pH 6.7 by the addition of aqueous 1 N sodium hydroxide with stirring, then cooled in an ice bath. 6-aminopenicillanic acid (200 mg.) is added thereto, followed by a solution of 190 mg. of N,N'-dicyclohexylcarbodiimide in 20 ml. of cold dioxane. The reaction mixture is stirred intermittently for about two hours and permitted to stand at 5° C. for three days. The mixture is filtered to remove a small amount of precipitate, which is discarded. The filtrate is evaporated to dryness in vacuo. The dried residue, comprising N-benzoyl-6-aminopenicillanic acid (phenyl penicillin), has activity in the penicillin assay, which activity can be destroyed by penicillinase.

EXAMPLE 5

*N-(3-indolepropionyl)-6-aminopenicillanic acid*

6-aminopenicillanic acid (100 mg.) and 3-indolepropionic acid (87 mg.) are dissolved in 10 ml. of water and the solution is adjusted to pH 6.8 by the addition of aqueous 1 N sodium hydroxide with stirring. The solution is then cooled to 5° C., and to it is added a solution of 100 mg. of N,N'-dicyclohexylcarbodiimide in 10 ml. of dioxane with stirring. The reaction mixture is permitted to stand at 5° C. overnight. It is thereafter filtered to remove a small quantity of precipitate, which is discarded. The filtrate, containing the N-(3-indolepropionyl)-6-aminopenicillanic acid produced by the reaction is evaporated to dryness in vacuo. The dried residue is dissolved in 10 ml. of water, and the solution is filtered to remove a trace of insoluble precipitate. The precipitate is discarded. The filtrate contains the N-(3-indolepropionyl)-6-aminopenicillanic acid having activity in the penicillan assay, which activity can be destroyed by penicillinase.

EXAMPLE 6

*N-hippuryl-6-aminopenicillanic acid*

The procedure of Example 5 is repeated, employing 73 mg. of hippuric acid instead of 3-indolepropionic acid. The product is N-hippuryl-6-aminopenicillanic acid.

EXAMPLE 7

*N-(N'-acetylglycyl)-6-aminopenicillanic acid*

The procedure of Example 5 is repeated, using N- acetylglycine instead of 3-indolepropionic acid. The product is N-(N'-acetylglycyl)-6-aminopenicillanic acid.

EXAMPLE 8

N-(N'-phenylglycyl)-6-aminopenicillanic acid

The procedure of Example 5 is repeated, employing 75 mg. of N-phenylglycine instead of 3-indolepropionic acid. The product is N-(N'-phenylglycyl)-6-aminopenicillanic acid.

EXAMPLE 9

Phenylmercaptomethyl penicillin

Phenylmercaptoacetic acid (77 mg.) is added to 10 ml. of cold water and the pH of the mixture is adjusted to about 6.5 by addition of aqueous 1 N sodium hydroxide with stirring. The resulting solution is filtered and 100 mg. of 6-aminopenicillanic acid are added to the filtered solution, followed by 250 mg. of N,N'-dicyclohexylcarbodiimide dissolved in 15 ml. of cold dioxane. The reaction mixture is agitated several times, after which it is permitted to stand 18 hours at about 5° C.

The reaction mixture is then filtered to remove a slight preciptiate, which is discarded. The clear filtrate containing the N-phenylmercaptoacetyl-6-aminopenicillanic acid produced by the reaction is evaporated to dryness in vacuo. The white residue comprising N-phenylmercaptoacetyl-6-aminopenicillanic acid (phenylmercaptomethyl penicillin) has activity in the penicillin assay, which activity can be destroyed with penicillinase.

EXAMPLE 10

Penicillin V

Phenoxyacetic acid, 6-aminopenicillanic acid, and N,N'-dicyclohexylcarbodiimide (140 mg., 100 mg., and 200 mg., respectively) are reacted and the reaction mixture is processed according to the procedure of Example 9 to provide N-phenoxyacetyl-6-aminopenicillanic acid (penicillin V).

EXAMPLE 11

Penicillin V

The procedure of Example 10 is repeated employing 200 mg. of N,N'-bis(p-dimethylaminophenyl)carbodiimide instead of N,N'-dicyclohexylcarbodiimide. Assay and chromatographic analysis shown the product to be penicillin V.

EXAMPLE 12

Penicillin V

The procedure of Example 10 is repeated, employing 200 mg. of N,N'-diisopropylcarbodiimide instead of N,N'-dicyclohexylcarbodiimide. Assay and chromatographic analysis show the product to be penicillin V.

EXAMPLE 13

2-thienylmethyl cephalosporin

The subject compound, 7-(2'-thienyl)acetamidocephalosporanic acid, is obtained from cephalosporin nucleus (7-aminocephalosporanic acid), 2-thienylacetic acid, and N,N'-dicyclohexylcarbodiimide by the procedure of Example 2.

EXAMPLE 14

Phenylmercaptomethyl cephalosporin

The subject compound, 7-phenylmercaptoacetamidocephalosporanic acid, is obtained from cephalosporin nucleus, phenyl mercaptoacetic acid, and N,N-diethylcarbodiimide by the procedure of Example 2.

EXAMPLE 15

2-benzofurylmethyl cephalosporin

The subject compound, 7-(2'-benzofurylacetamido)-cephalosporanic acid, is obtained from cephalosporin nucleus, 2-benzofuranacetic acid, and N,N'-diallylcarbodiimide by the procedure of Example 2.

I claim:
1. A process for preparing an antibiotic substance selected from the group consisting of the penicillins and the cephalosporins, which comprises preparing a solution of 6-aminopenicillanic acid or 7-aminocephalosporanic acid and at least about an equimolar proportion of the monocarboxylic acid corresponding to the acylamido moiety of said antibiotic substance in an aqueous, inert mutual solvent therefor, adding thereto a solution of a carbodiimide in at least equimolar proportion to said 6-aminopenicillanic acid or 7-aminocephalosporanic acid, said carbodiimide having the structure

$$R^1\!-\!N\!=\!C\!=\!N\!-\!R^2$$

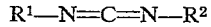

wherein $R^1$ and $R^2$ are $C_1$–$C_{12}$ aliphatic groups, $C_3$–$C_7$ cycloaliphatic groups, or phenyl, or substituted forms thereof having amino, alkylamino, dialkylamino, phenyl, pyridyl, pyrimidyl, piperidyl, pyrryl, pyrrolidyl, or morpholinyl as substituents, whereby said 6-aminopenicillanic acid or 7-aminocephalosporanic acid and said acid are caused to react to form said antibiotic substance, and recovering said antibiotic substance from the reaction mixture.

2. A process for preparing an antibiotic substance selected from the group consisting of the penicillins and the cephalosporins, which comprises preparing an aqueous solution of 6-aminopenicillanic acid or 7-aminocephalosporanic acid and at least about an equimolar proportion of the monocarboxylic acid corresponding to the acylamido moiety of said antibiotic substance, adding thereto an aqueous solution of a water-soluble carbodiimide in at least equimolar proportion to said 6-aminopenicillanic acid or 7-aminocephalosporanic acid, said carbodiimide having the structure $$R^1\!-\!N\!=\!C\!=\!N\!-\!R^2$$

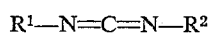

wherein $R^1$ and $R^2$ are $C_1$–$C_2$ aliphatic groups, $C_3$–$C_7$ cycloaliphatic groups, or phenyl, or substituted forms thereof having amino, alkylamino, dialkylamino, phenyl, pyridyl, pyrimidyl, piperidyl, pyrryl, pyrrolidyl, or morpholinyl as substituents, whereby said 6-aminopenicillanic acid or 7-aminocephalosporanic acid and said acid are caused to react to form said antibiotic substance, and recovering said anto-biotic substance from the reaction mixture.

3. A process for preparing a penicillin compound which comprises preparing a solution of 6-aminopenicillanic acid and an at least equimolar proportion of a monocarboxylic acid in an aqueous, inert mutual solvent for said substances, adding thereto a solution of a carbodiimide in at least equimolar proportion to said 6-aminopenicillanic acid, said carbodiimide having the structural formula $$R^1\!-\!N\!=\!C\!=\!N\!-\!R^2$$

wherein $R^1$ and $R^2$ are $C_1$–$C_{12}$ aliphatic groups, $C_3$–$C_7$ cycloaliphatic groups, or phenyl, or substituted forms thereof having amino, alkylamino, dialkylamino, phenyl, pyridyl, pyrimidyl, piperidyl, pyrryl, pyrrolidyl, or morpholinyl as substituents, whereby said substances are caused to react to form an N-carbacyl-6-aminopenicillanic acid, and recovering said N-carbacyl-6-aminopencillanic acid from the reaction mixture.

4. The process of claim 3 wherein said solvent is a mixture of water and dioxane.

5. The process of claim 3 wherein said carbodiimide is N,N'-dicyclohexylcarbodiimide.

6. The process of claim 3 wherein the reaction of said substances is carried out at a pH between about 5 and about 8.

7. A process for preparing a cephalosporin compound which comprises preparing a solution of 7-aminocephalosporanic acid and an at least equimolar proportion of a monocarboxylic acid in an aqueous, inert mutual solvent for said substances, adding thereto a solution of a carbodiimide in at least equimolar proportion to said 7-aminocephalosporanic acid, said carbodiimide having the structural formula $$R^1\text{—}N\text{=}C\text{=}N\text{—}R^2$$

wherein $R^1$ and $R^2$ are $C_1$–$C_{12}$ aliphatic groups, $C_3$–$C_7$ cycloaliphatic groups, or phenyl, or substituted forms thereof having amino, alkylamino, dialkylamino, phenyl, pyridyl, pyrimidyl, piperidyl, pyrryl, pyrrolidyl, or morpholinyl as substituents, whereby said substances are caused to react to form an N-carbacyl-7-aminocephalosporanic acid, and recovering said N-carbacyl-7-aminocephalosporanic acid from the reaction mixture.

8. The process of claim 7 wherein said solvent is a mixture of water and dioxane.

9. The process of claim 7 wherein said carbodiimide is N,N'-dicyclohexylcarbodiimide.

10. The process of claim 7 wherein the reaction of said substances is carried out at a pH between about 5 and about 8.

References Cited by the Examiner

UNITED STATES PATENTS

| | | | |
|---|---|---|---|
| 3,040,033 | 6/1962 | Celmer | 260—239.1 |
| 3,120,514 | 2/1964 | Doyle et al. | 260—239.1 |
| 3,142,673 | 7/1964 | Hobbs | 260—239.1 |
| 3,159,617 | 12/1964 | Sheehan | 260—239.1 |
| 3,174,964 | 3/1965 | Hobbs et al. | 260—239.1 |

OTHER REFERENCES

Eynde: Industria Chimeque Belge, vol. 29, No. 1, pp. 15–22 (1964).

Morton: The Chemistry of Heterocyclic Compounds, page VI of the preface (1946).

Sheehan et al.: Journal American Chemical Society, pp. 1067–68 (1955).

Sheehan et al.: Journal Organic Chemistry, vol. 21, pp. 439–441 (1956).

NICHOLAS S. RIZZO, *Primary Examiner.*

JAMES W. Adams, *Assistant Examiner.*